(12) United States Patent
Mohamed Shokr et al.

(10) Patent No.: US 11,310,082 B2
(45) Date of Patent: Apr. 19, 2022

(54) DEVICES AND METHODS FOR ESTIMATING NOISE COVARIANCE

(71) Applicant: Intel Corporation, Santa Clara, CA (US)

(72) Inventors: Hossam Mohamed Shokr, Munich (DE); Guang Xu, Munich (DE); Rajarajan Balraj, Nuremberg (DE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/007,029

(22) Filed: Aug. 31, 2020

(65) Prior Publication Data

US 2021/0099325 A1 Apr. 1, 2021

(30) Foreign Application Priority Data

Oct. 1, 2019 (EP) .................................... 19200770

(51) Int. Cl.
*H04L 25/02* (2006.01)

(52) U.S. Cl.
CPC ........ *H04L 25/021* (2013.01); *H04L 25/0242* (2013.01)

(58) Field of Classification Search
CPC .......................... H04L 25/021; H04L 25/0242
See application file for complete search history.

(56) References Cited

U.S. PATENT DOCUMENTS

| | | | |
|---|---|---|---|
| 8,842,622 B2 * | 9/2014 | Zhang .................... | H04B 7/024 370/329 |
| 2010/0099428 A1 * | 4/2010 | Bhushan .............. | H04J 11/0059 455/452.1 |
| 2011/0176629 A1 * | 7/2011 | Bayesteh ............. | H04B 7/0632 375/267 |
| 2017/0264466 A1 | 9/2017 | Hosseini et al. | |
| 2019/0132753 A1 * | 5/2019 | Devarasetty .......... | H04W 24/06 |
| 2019/0349023 A1 * | 11/2019 | Ge ........................ | H04L 5/0012 |

OTHER PUBLICATIONS

Intel Corporation, "Summary of Thursday offline discussion for NR Radio Link Monitoring", dated Nov. 27-Dec. 1, 2017, 8 pages, R1-1721377, 3GPP, TSG RAN WG1, Meeting #91, Reno, USA.
European Search Report issued for the corresponding EP application No. 19 20 0770, dated Mar. 16, 2020, 8 pages (for informational purpose only.
3rd Generation Partnership Project, "Technical Specification Group Radio Access Network", dated Sep. 2019, pp. 32-33, 3GPP, TS 38.214 V15.7.0, release 15.

* cited by examiner

*Primary Examiner* — Janice N Tieu
(74) *Attorney, Agent, or Firm* — Viering, Jentschura & Partner MBB

(57) ABSTRACT

A communication device and methods for computing a noise covariance matrix by using unused resources as determined from a first information. The methods and devices are configured to demodulate and decode the first information; determine one or more resource elements during which data is not transmitted to the communication device based on the first information; obtain samples for the one or more determined resource elements; and compute a noise covariance matrix based on the obtained samples.

20 Claims, 11 Drawing Sheets

1100

DEVICES AND METHODS FOR ESTIMATING NOISE COVARIANCE

CROSS-REFERENCE TO RELATED APPLICATIONS

This application claims priority to European Application No. 19 200 770 filed on Oct. 1, 2019, which is herein incorporated by reference in its entirety.

TECHNICAL FIELD

Various aspects relate generally to wireless communications.

BACKGROUND

In wireless communications, communication devices need to perform channel and noise estimations in order to effectively receive and process signals. For example, in radio communications such as new radio (NR) communications, the noise covariance estimation for the Physical Downlink Shared Channel (PDSCH) may be based on a user equipment (UE), i.e., terminal device, specific Demodulated Reference Signal (DMRS). The received DMRS contains information on channel and background noise and, therefore, may be used for the channel and noise estimation.

According to current methods, to estimate the noise covariance, frequency direction and time direction filtering for the channel estimate need to be performed first, and, after this is accomplished, noise samples may be obtained after noise filtering. This is achieved by taking the difference between the raw DMRS and the channel estimates. However, this approach presents several problems. First, it may lead to a low-quality noise covariance estimation due to an insufficient number of filter taps. Second, current methods of noise estimation require both channel and noise filtering, which consumes vast amounts of processing resources and cycles.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
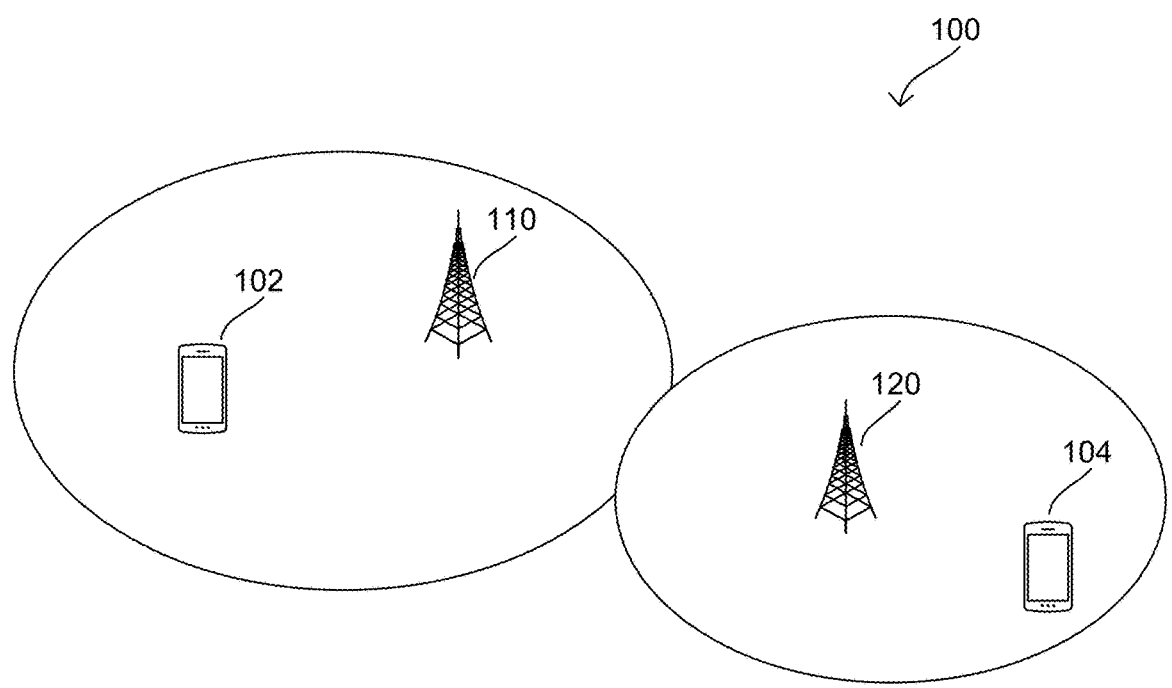
FIG. 1 shows an exemplary radio communication network according to some aspects.

Regarding the first problem discussed above, in order to improve the quality of noise covariance estimation for a communication channel, such as the Physical Downlink Shared Channel (PDSCH), according to current methods, the number of taps for the channel filter may be increased to obtain more accurate channel estimates. However, increasing the number of filter taps will consume a higher processing load, which may not be supported due to hardware and/or firmware design. Moreover, the number of filter taps is also limited by Resource Block (RB) granularity at the transmitter for precoding, which is restricted to certain values if a wideband (WB) precoder is not used. With respect to the second problem to reduce the resource and cycle consumption for the noise covariance estimation, one solution is to only use frequency direction filtering and not use time direction filtering. However, this will degrade the quality of the noise covariance estimation.

Accordingly, the disclosure provided herein presents methods and devices which address the above-mentioned problems while providing high quality and reliable noise covariance estimation techniques. By employing a method which accounts for resource elements (REs) which remain unused in a region, e.g. a region allocated for DMRS transmission, and using these REs directly to compute the noise covariance matrix, the disclosure herein is able to efficiently and reliably determine the noise covariance at while using fewer processing resources and cycles.

The methods and devices of this disclosure exploit the information indicating which resource elements (REs) are allocated to a certain communication device, or a group of communication devices, to compute the noise estimates while reducing the amount of filtering needed. For example, in new radio (NR) communications such a $5^{th}$ Generation (5G) communications, a Physical Downlink Shared Channel (PDSCH) noise estimation technique which adopts a process using unused-REs in the DMRS region is explained. According to standards provided by the Third Generation Partnership Project (3GPP), for example, the PDSCH RA/P/SI-RNTI may be scheduled by DCI format 1_0 as discussed in 3GPP TS 38.214, version 15.6.0. This format includes unused REs in the DMRS region. Instead of ignoring these REs for signal processing, the methods and devices disclosed herein utilize the samples obtained in these REs to compute the noise covariance without the need for additional filtering from the channel estimate. In other words, the methods and devices of this disclosure may use those RE blocks of the reserved Code Division Multiplexing (CDM) group in the DMRS region which do not contain data to determine the noise estimate at the terminal device. The samples obtained from these REs will not include transmissions intended for the terminal device or other communication devices. Accordingly, the terminal device is configured to use these REs to directly compute the noise covariance matrix.

By employing this approach, no channel or noise filtering is required for noise covariance estimation, which significantly reduces the processing resources and cycles. In addition, the unused RE samples for the reserved CDM group can reveal the true background noise, and therefore, provide reliable noise covariance estimation, leading to increased performance compared to previous approaches.

While sections of this disclosure may focus on the computation of the noise covariance estimate in the downlink direction for NR communications, it is appreciated that similar methods may be employed in the uplink direction and in other Radio Access Technologies (RATs) and are therefore intended to be included within the scope of this disclosure. In general, the devices and methods discussed herein may be applied to all RATs and between any communication devices that are able to determine unused resources in the time and frequency domain from a first information, e.g. a control information, and exploit this knowledge in order to determine a background noise of a system without the need to first rely on the channel estimate and then apply a noise filtering. In other words, the disclosure herein provides a manner to determine the noise estimate independent of channel filtering.

The following detailed description refers to the accompanying drawings that show, by way of illustration, specific details and aspects in which the disclosure may be practiced.

The word "exemplary" is used herein to mean "serving as an example, instance, or illustration." Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication arrangement/Extended Total Access Communication arrangement (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
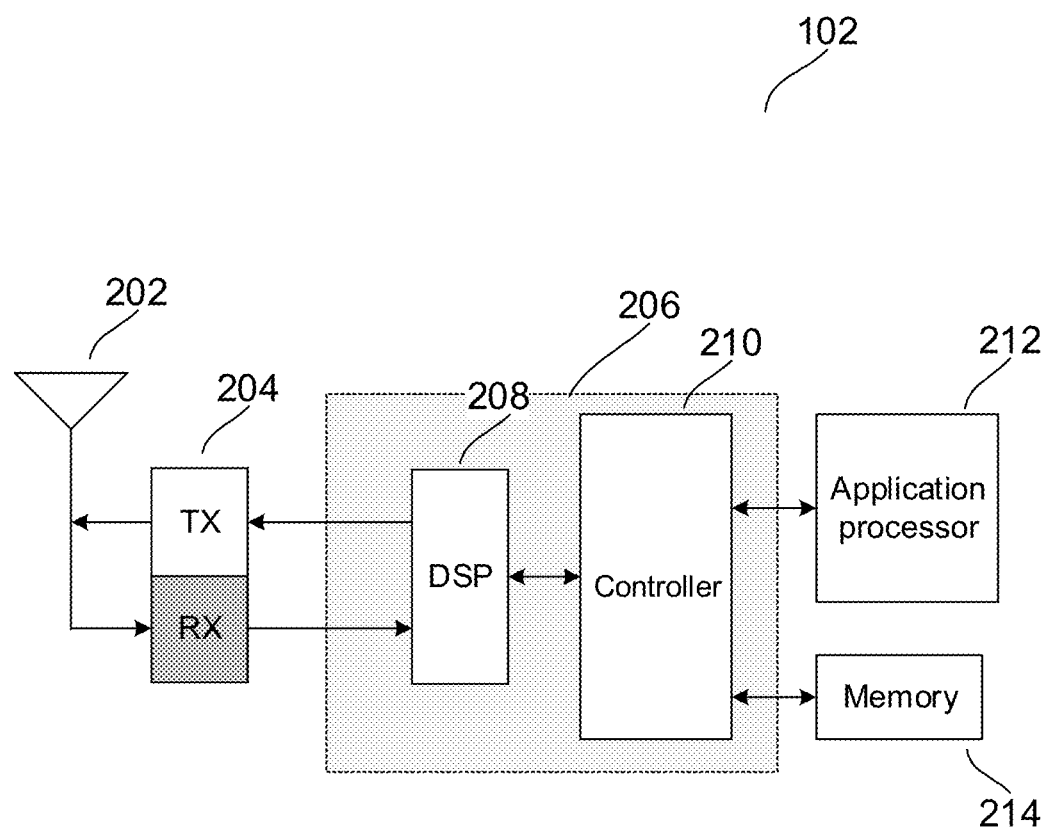
FIG. 2 shows an exemplary internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FI, in some aspects antenna system 202, RF transceiver 204, digital signal processor 208, and/or protocol controller 210 can encompass separate components dedicated to different radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Figure 3:
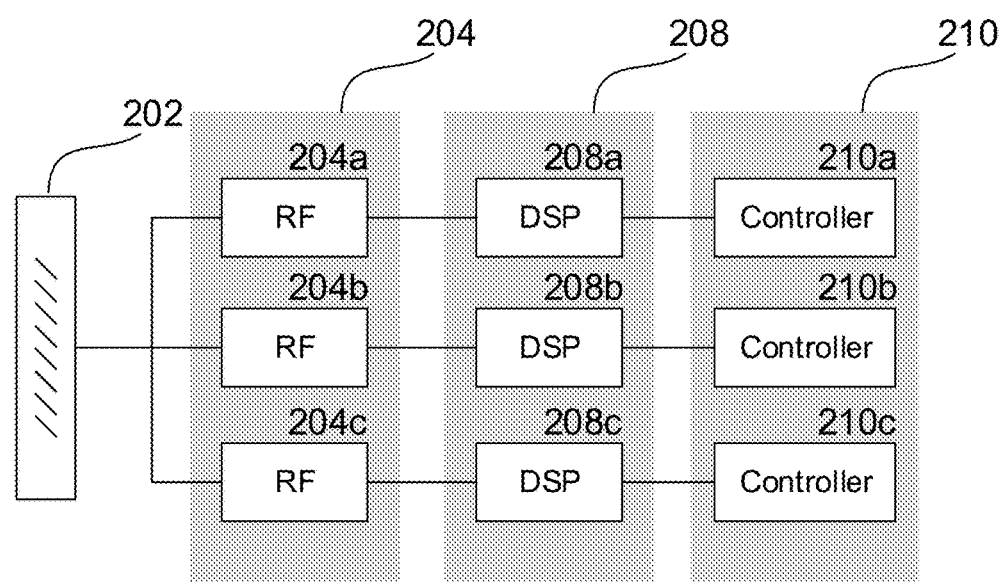
FIG. 3 shows an exemplary configuration of signal acquisition and processing circuitry according to some aspects.

FIG. 3 shows an example in which RF transceiver 204 includes RF transceiver 204a for a first radio communication technology, RF transceiver 204b for a second radio communication technology, and RF transceiver 204c for a third radio communication technology. Likewise, digital signal processor 208 includes digital signal processor 208a for the first radio communication technology, digital signal processor 208b for the second radio communication technology, and digital signal processor 208c for the third radio communication technology. Similarly, controller 210 may include controller 210a for the first radio communication technology, controller 210b for the second radio communication technology, and controller 210c for the third radio communication technology. RF transceiver 204a, digital signal processor 208a, and controller 210a thus form a communication arrangement (e.g., the hardware and software components dedicated to a particular radio communication technology) for the first radio communication technology, RF transceiver 204b, digital signal processor 208b, and controller 210b thus form a communication arrangement for the second radio communication technology, and RF transceiver 204c, digital signal processor 208c, and controller 210c thus form a communication arrangement for the third radio communication technology. While depicted as being logically separate in FIG. 3, any components of the communication arrangements may be integrated into a common component.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 4:
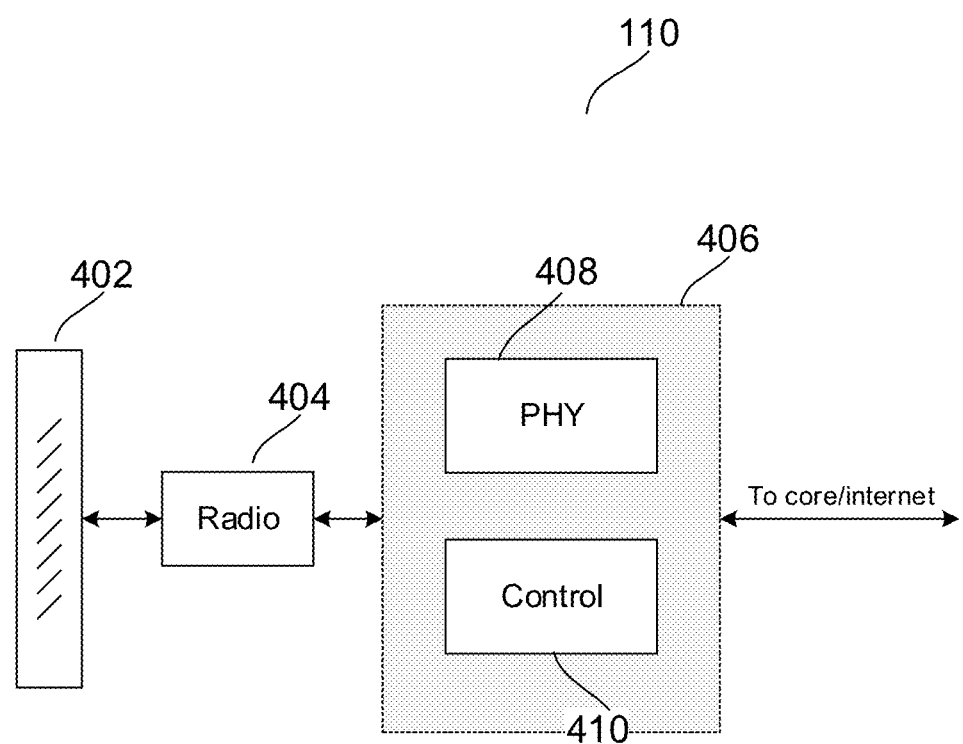
FIG. 4 shows an exemplary internal configuration of a network access node in some aspects.

FIG. 4 shows an exemplary internal configuration of a network access node, such as network access node 110, according to some aspects. As shown in FIG. 4, network access node 110 may include antenna system 402, radio transceiver 404, and baseband subsystem 406 (including physical layer processor 408 and protocol controller 410). In an abridged overview of the operation of network access node 110, network access node 110 may transmit and receive wireless signals via antenna system 402, which may be an antenna array including multiple antennas. Radio transceiver 404 may perform transmit and receive RF processing to convert outgoing baseband samples from baseband subsystem 406 into analog radio signals to provide to antenna system 402 for radio transmission and to convert incoming analog radio signals received from antenna system 402 into baseband samples to provide to baseband subsystem 406. Physical layer processor 408 may be configured to perform transmit and receive PHY processing on baseband samples received from radio transceiver 404 to provide to controller 410 and on baseband samples received from controller 410 to provide to radio transceiver 404. Controller 410 may control the communication functionality of network access node 110 according to the corresponding radio communication technology protocols, which may include exercising control over antenna system 402, radio transceiver 404, and physical layer processor 408. Each of radio transceiver 404, physical layer processor 408, and controller 410 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 404 may be a radio transceiver including digital and analog radio frequency processing and amplification circuitry. In some aspects, radio transceiver 404 may be a software-defined radio (SDR) component implemented as a processor configured to execute software-defined instructions that specify radio frequency processing routines. In some aspects, physical layer processor 408 may include a processor and one or more hardware accelerators, wherein the processor is configured to control physical layer processing and offload certain processing tasks to the one or more hardware accelerators. In some aspects, controller 410 may be a controller configured to execute software-defined instructions that specify upper-layer control functions. In some aspects, controller 310 may be limited to radio communication protocol stack layer functions, while in other aspects controller 410 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

Figure 5:
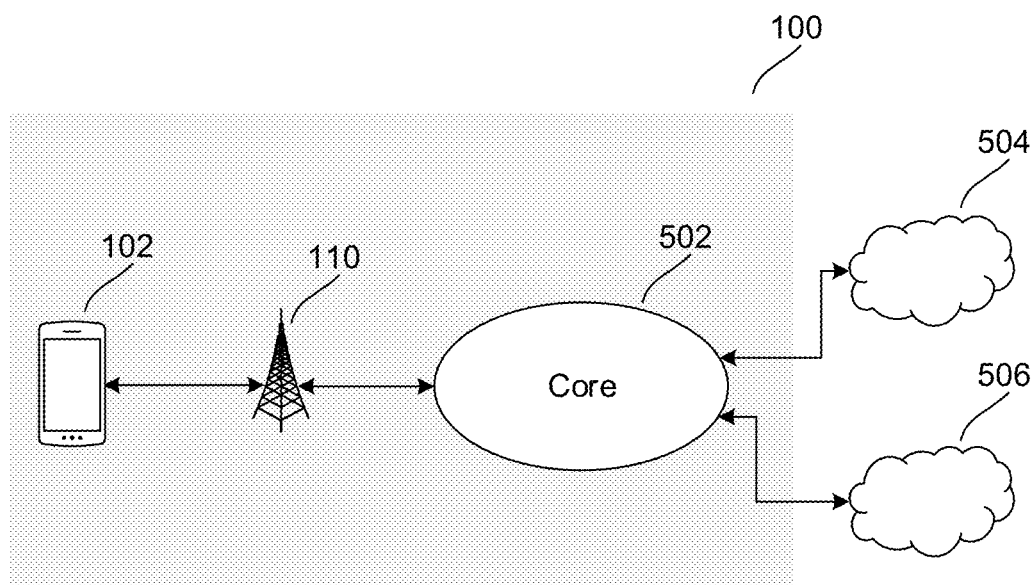
FIG. 5 shows an exemplary configuration of a network access node interfacing with core network according to some aspects.

As previously indicated, network access nodes 110 and 120 may interface with a core network. FIG. 5 shows an exemplary configuration in accordance with some aspects where network access node 110 interfaces with core network 502, which may be, for example, a cellular core network. Core network 502 may provide a variety of functions to manage operation of radio communication network 100, such as data routing, authenticating and managing users/subscribers, interfacing with external networks, and various other network control tasks. Core network 502 may therefore provide an infrastructure to route data between terminal device 104 and various external networks such as data network 504 and data network 506. Terminal device 102 may thus rely on the radio access network provided by network access node 110 to wirelessly transmit and receive data with network access node 110, which may then provide the data to core network 502 for further routing to external locations such as data networks 504 and 506 (which may be packet data networks (PDNs)). Terminal device 102 may therefore establish a data connection with data network 504 and/or data network 506 that relies on network access node 110 and core network 502 for data transfer and routing.

The methods described herein may be controlled and carried out by the components of the baseband modem 206, e.g. the DSP 208 and/or the controller 208, of a terminal device 102 or by the components of the baseband subsystem 406 of a network access node 110. It is appreciated that while some parts of this explanation may be directed towards a particular radio access technology (e.g. 5G) or a particular communication device (e.g. a terminal device, i.e. a UE), the methods and devices described herein may be deployed to perform noise covariance techniques according to other communication standards and directions (e.g. in the downlink at the base station) with the perquisite being that a knowledge of the resource element allocation (across the slots and sub-carriers) must be able to be determined in order to exploit those resource elements which remain unused and use them to estimate a noise covariance matrix.

Figure 6:
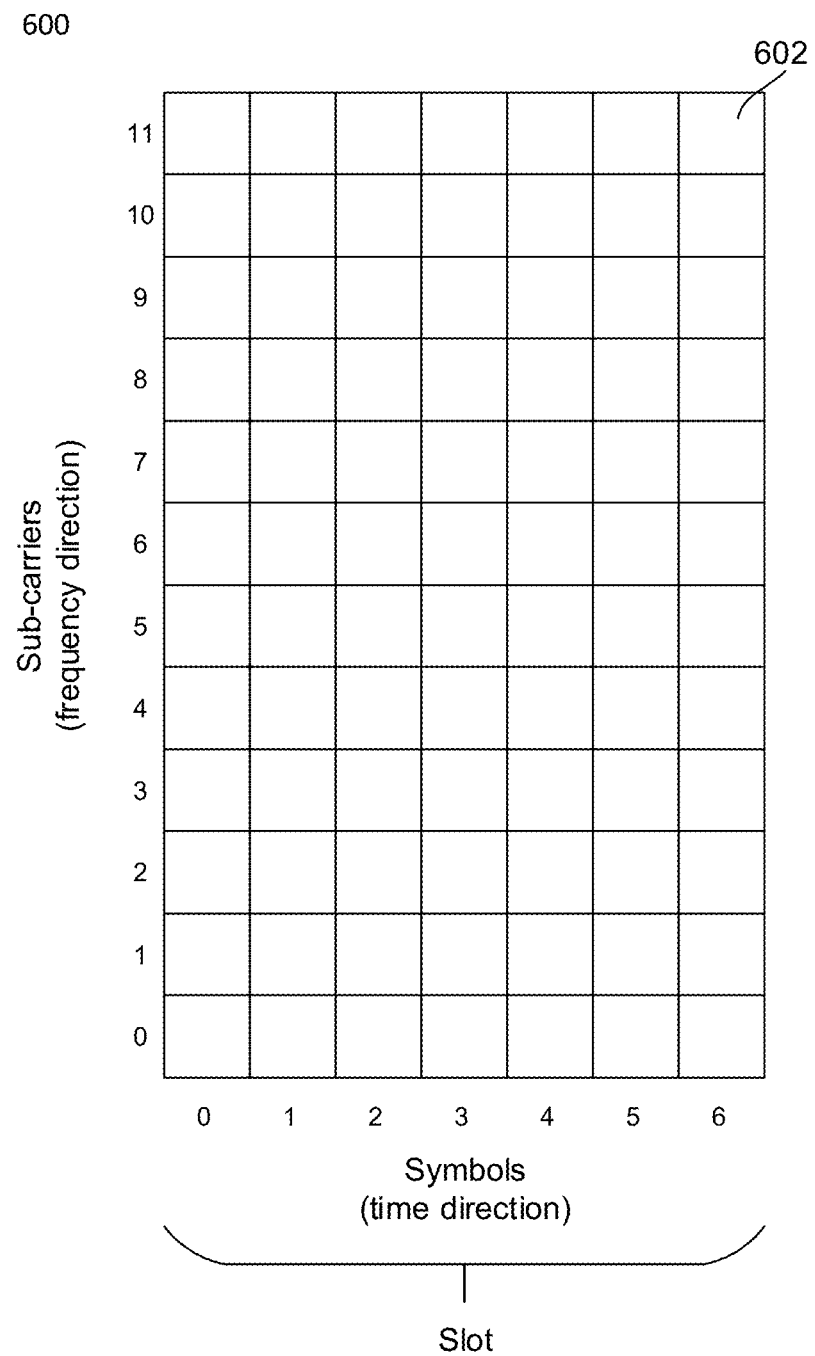
FIG. 6 shows an exemplary resource block for transmitting data using REs according to some aspects.

FIG. 6 shows an exemplary resource block 600 which may be employed by a transmitting device to allocate resources to send to one or more receiving devices according to some aspects. A resource block 600 is the smallest unit of resources that be transmitted by a network access node and is composed of a plurality of resource elements (REs, one RE is indicated by 602) spanning both time and frequency directions. The resource blocks are allocated within a frame structure employed by the transmitting and/or receiving devices in wireless communications. For example, in 5G communications, the subcarrier spacing is derived from the basic 15 kHz subcarrier spacing used in LTE. However, 5G may support multiple other different types of subcarrier spacing as compared to LTE. A frame may have a duration of 10 ms and consist of 10 subframes with a duration of 1 ms each. Each subframe may have 2 slots, wherein each slot typically consists of 7 OFDM symbols. Each slot of the frame structure may correspond to the size of a resource block 600 in the time direction.

A resource block 600 may be split in the frequency direction into a plurality of sub-carriers, e.g. 12 sub-carriers are shown in resource block 600, but it is appreciated that other numbers of sub-carriers may be used depending on the Radio Access Technology (RAT) and/or communication protocol. Also, the resource block is split in the time direction into a plurality of symbols, e.g. 7 symbols are shown in resource block 600, but it is appreciated that other numbers of symbols may be used depending on the RAT and/or communication protocol standard. For example, 6 symbols may be used if an extended cyclic prefix (CP) is inserted to each symbol in scenarios with a higher delay spread.

Figure 7:
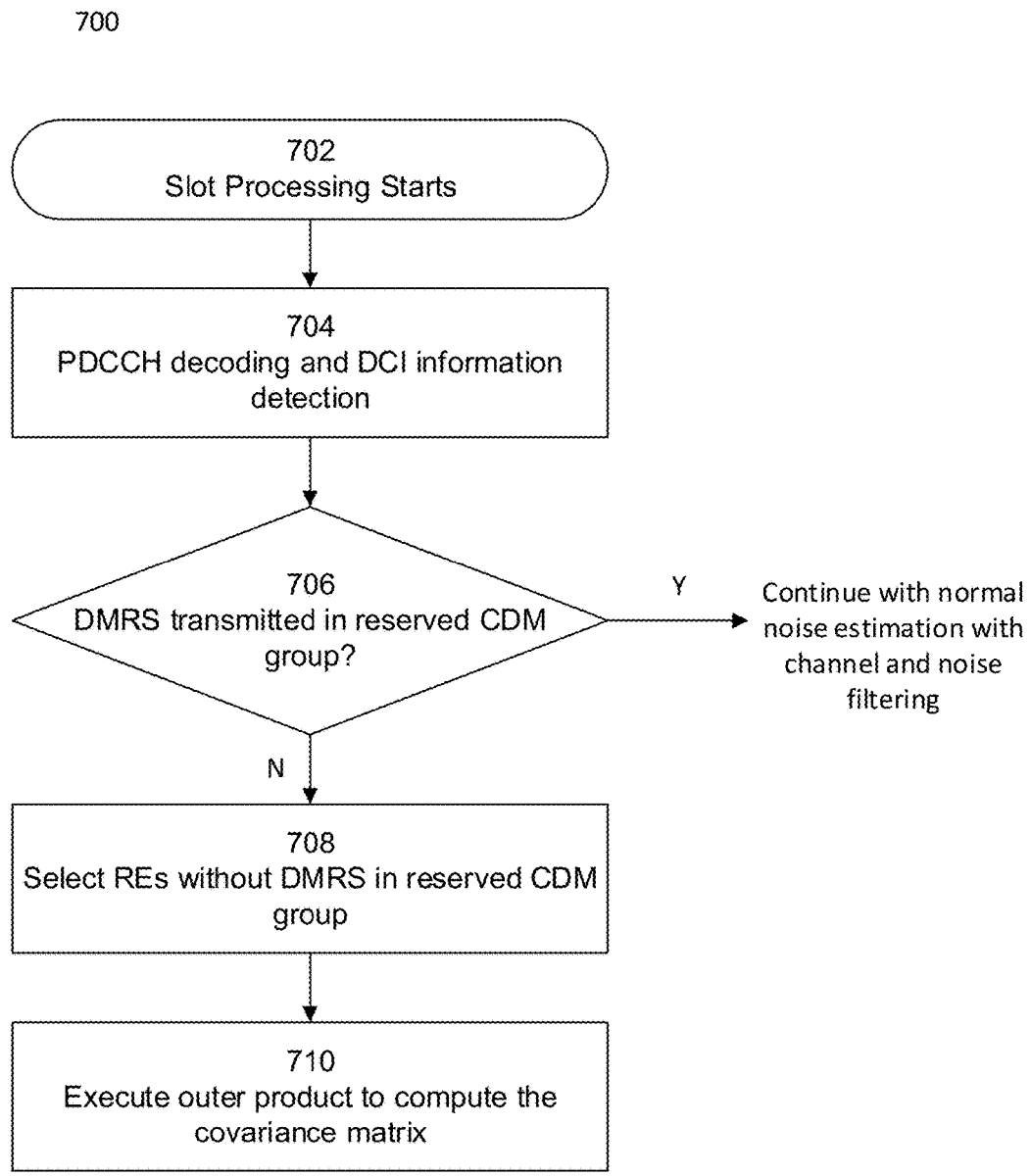
FIG. 7 shows an exemplary flowchart describing a method for NR PDSCH noise estimation according to some aspects.

FIG. 7 shows a flowchart 700 describing a method for NR PDSCH noise estimation based on unused DMRS REs in a reserved CDM group according to some aspects. It is appreciated that flowchart 700 is exemplary in nature and may thus be simplified for purposes of this explanation.

Figure 8:
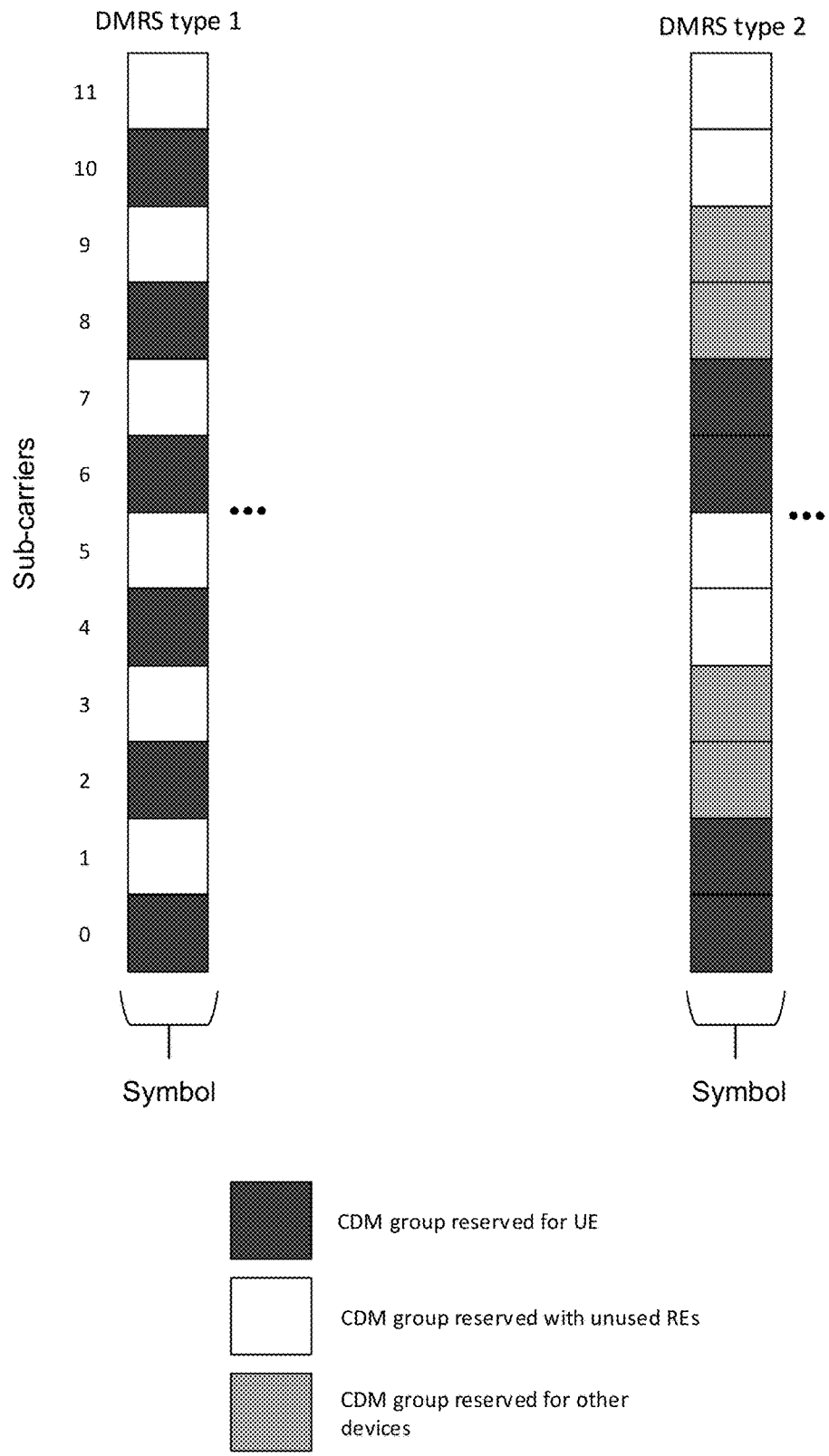
FIG. 8 shows examples of RE allocation based on CDM groups according to some aspects.

In 702, after synchronizing with another device (e.g. a network access node) and receiving the DMRS, slot processing starts, and the terminal device may start to demodulate and decode the Physical Downlink Control Channel (PDCCH) to obtain the Downlink Control Information (DCI) 704. Once the DCI is detected, the terminal device is able to determine information indicating PDSCH DMRS types and the antenna configuration index. Two examples of reserved CDM groups without DMRS data transmitted in every RE are shown in FIG. 8, wherein REs in each ODFM symbol of the different DMRS types without an Antenna Port (AP) assigned for transmission are located in the CDM group reserved for unused REs (i.e. white boxes). Table I below shows examples of reserved CDM groups for DMRS types with different antenna configuration indices (maxLen is a parameter that indicates the maximum number of front-loaded DMRS symbols for PDSCH and is given by the DMRS-DownlinkConfig).

TABLE I

| DMRS type | Antenna configuration indices | # of reserved CDM group |
| --- | --- | --- |
| Type 1 maxLen = 1 | 3-8 | 1 |
| Type 1 maxLen = 2 | 3-8, 12-25 | 1 |
| Type 2 maxLen = 1 | 3-8, 20-22 | 1 |
| Type 2 maxLen = 1 | 11-19 | 2 |
| Type 2 maxLen = 2 | 3-8, 20-22, 54-57 | 1 |
| Type 2 maxLen = 2 | 11-19, 24-47 | 2 |

Based on the DMRS types and antenna configuration determined in 704, the terminal device can determine whether there are REs which are not used for DMRS transmission in the respective reserved CDM group 706. If there is DMRS data transmitted in all the REs of the reserved CDM group, the terminal device may continue with a conventional noise estimation approach, i.e. with channel and noise filtering. However, if there are REs with no DMRS data transmitted in the reserved CDM group, the terminal device may select the unused REs over all the OFDM symbols 708 and store samples taken for these REs in a buffer.

Then, the device may execute an outer product on the selected REs stored in the buffer to compute a noise covariance matrix 710. The device may further apply the average of the noise covariance matrix for the samples corresponding to the unused REs across the resource block. The noise covariance per resource block may then directly be obtained without any additional filtering operations as would be required taking the conventional approach, i.e. only accounting for REs assigned to the terminal device in the reserved CDM group and performing both channel estimates and noise estimate from these assigned REs.

The noise covariance matrix $(\Phi) \in \mathbb{C}^{N_{RX} \times N_{RX}}$ may be computed according to the following equation:

$$\Phi = \frac{1}{N_{RE}} \sum_{i=0}^{N_{RE}} n_i n_i^H$$

where $n_i \in \mathbb{C}^{N_{RX} \times 1}$ s the noise samples vector per RE i, $N_{RX}$ is the number of the receive antenna, and $N_{RE}$ is the total number of REs.

Once the noise covariance matrix of the REs is obtained, the contribution of the terminal device's own channel may be subtracted from it to obtain the true background noise.

FIG. 8 shows exemplary diagrams depicting examples of REs of unused DMRS located in a reserved CDM group of one OFDM symbol according to some aspects. Two examples of DMRS types are shown: DMRS type 1 and DMRS type 2. Each example shows the DMRS type spanning one symbol and twelve subcarriers. It is appreciated that while only one symbol is shown for each DMRS type, selection of the unused RE similarly applies across the entire region allocated for DMRS transmission.

In DMRS type 1, the blocks shaded with the dark color are REs with antenna ports assigned to communicate DMRS data to the terminal device. The blocks with no shading are unused REs, i.e. these REs belong to a CDM group reserved without antenna port transmissions. The terminal device may, therefore, be configured to take samples of these unused REs (i.e. for DMRS type 1, REs in subcarriers 1, 3, 5, 7, 9, and 11) and use these samples to compute the noise covariance matrix as described herein. The noise covariance matrix may be calculated by taking the outer product of the samples of the unused REs and also taking the average of the outer product and applying it over all the samples of the respective resource block. For DMRS type 2, in addition to there being REs dedicated to the terminal device (dark shading, i.e. REs in subcarriers 0, 1, 6, and 7) and unused REs (no shading, i.e. REs in subcarriers 4, 5, 10, and 11), there are REs allocated to other devices, i.e. potential interfering devices (light shading, i.e. REs in subcarriers 2, 3, 8, and 9). Note that in the unused REs in type 1 and 2, no information is transmitted to the target terminal device or the interferer terminal device(s) in the CDM group reserved with unused REs, and the samples taken in these REs are those used in the computation of the noise covariance matrix of this disclosure.

Figure 9:
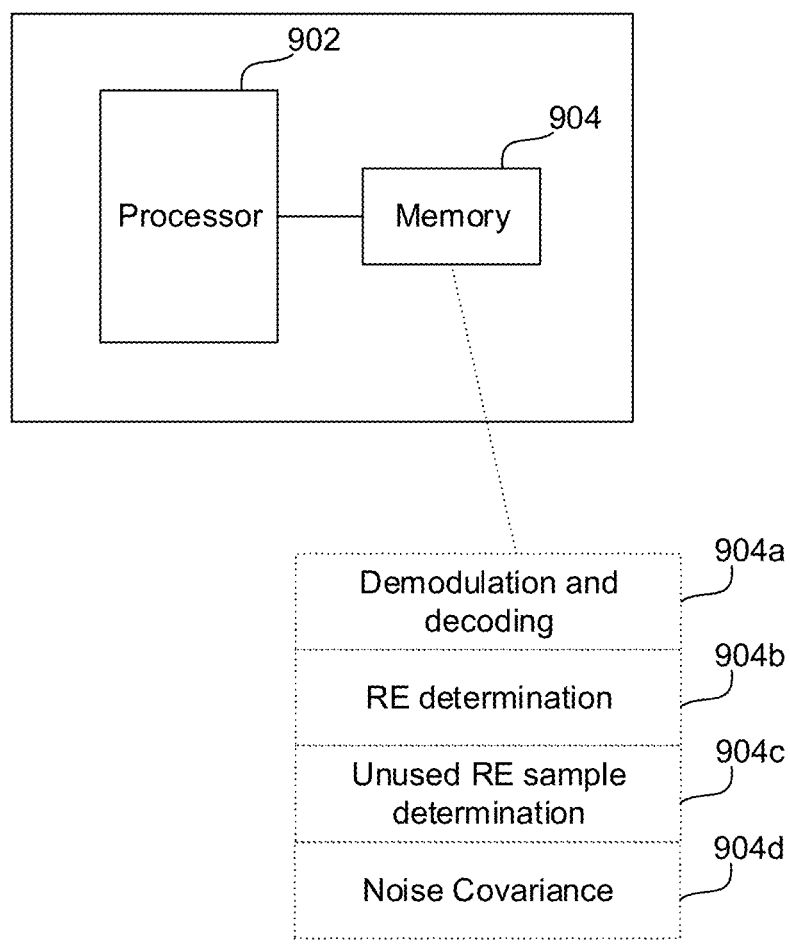
FIG. 9 shows an exemplary internal configuration of a baseband modem for implementing methods according to some aspects.

FIG. 9 shows an exemplary internal configuration of based modem 206 according to some aspects. As shown in FIG. 9, based modem 206 may include processor 902 and memory 904. Processor 902 may be a single processor or multiple processors, and may be configured to retrieve and execute program code to perform the transmission and reception, channel resource allocation, and cluster management as described herein. Processor 902 may transmit and receive data over a software-level connection that is physically transmitted as wireless radio signals by digital signal processor 208, RF transceiver 204, and antenna 202. Memory 904 may be a non-transitory computer readable medium storing instructions for one or more of a demodulation and decoding subroutine 904a, RE determination subroutine 904b, unused RE sample determination subroutine 904c, and/noise covariance subroutine 904d.

Demodulation and decoding subroutine 904a, RE determination subroutine 904b, unused RE sample determination subroutine 904c, and/noise covariance subroutine 904d may each be an instruction set including executable instructions that, when retrieved and executed by processor 902, perform the functionality of controller 210 and the methods as described herein. In particular, processor 902 may execute demodulation and decoding subroutine 904a to demodulate and decode data transmitted on a control channel to obtain a control information. For example, this may include demodulating and decoding PDCCH data to obtain the Downlink Control Information (DCI). Processor 902 may execute RE determination subroutine 904b to determine whether there are REs which are unused. For example, based on the DMRS types and antenna configuration obtained from the control information, the processor 902 could determine if there are unused REs in the DMRS region. Processor 902 may also execute unused RE sample determination subroutine 904c to determine samples for these unused REs and may store the samples in a buffer, e.g. in a memory. This may include taking the samples for the unused REs across the entire DMRS region. For example, the DMRS region may span two time slots and twelve or twenty-four subcarriers. Processor 902 may execute noise covariance subroutine 904d to determine the noise covariance of based on these samples. This may include performing the outer product on the samples taken for the unused REs. Additionally, this may include taking the average of the outer product and applying it across all the samples received in the resource block. The noise covariance per resource block is therefore directly obtained without any additional filtering operations after the channel estimate.

Figure 10:
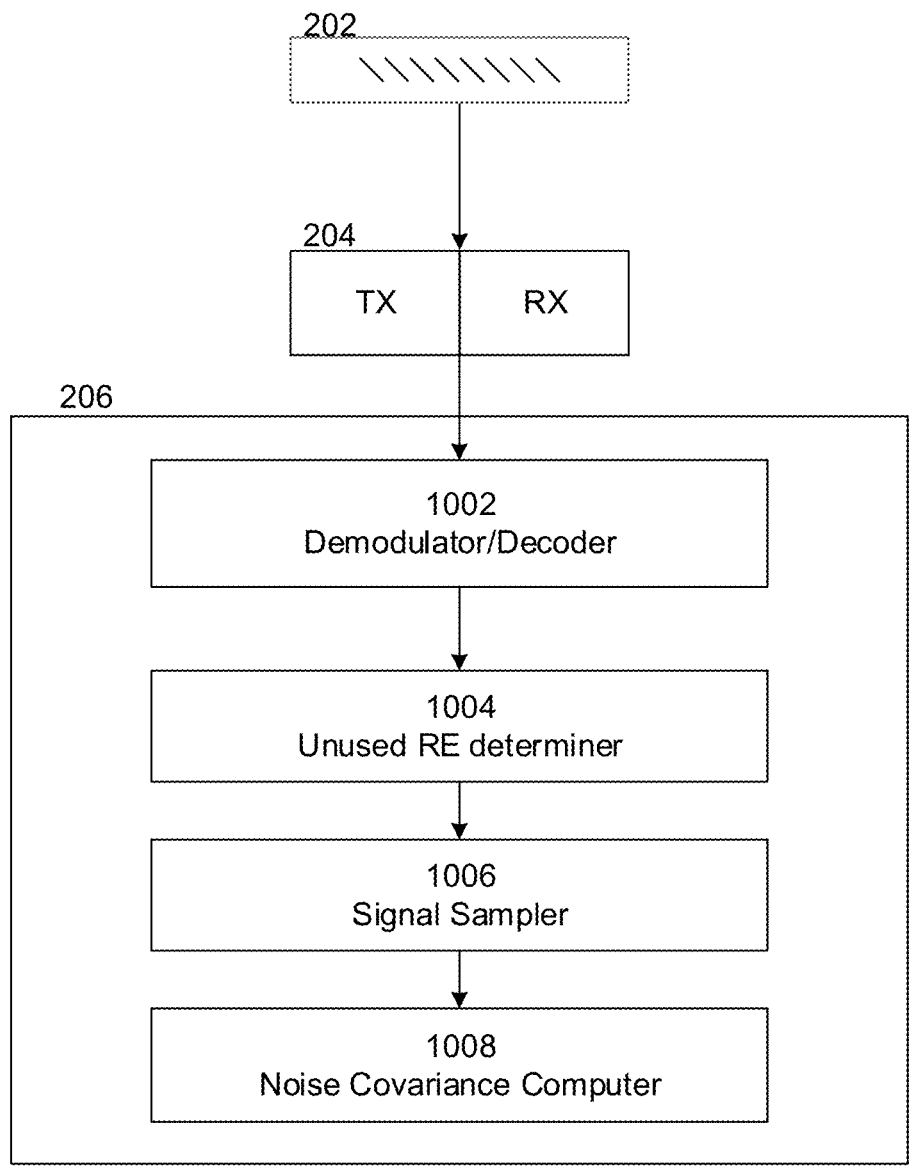
FIG. 10 shows an exemplary internal diagram a terminal device depicting components according to some aspects.

FIG. 10 shows an internal diagram a terminal device 102 depicting components according to some aspects. Accordingly, the illustrated depiction of FIG. 10 may omit certain components of terminal device 102 that are not directly related to methods described herein. Additionally, components depicted as being separate in FIG. 10 may be incorporated into a single, hybrid component that performs the same functions as the separate components, and, similarly, single components may be split into two or more separate components that perform the same function as the single component.

As shown in FIG. 10, the baseband modem 206 may include a demodulator and decoder 1002 configured to demodulate and decode data transmitted on a control channel to obtain a control information. Baseband modem 206 may include an unused RE determiner 1004 configured to determine whether there are REs which are unused in a particular region, e.g. region allocated for DMRS transmissions. Baseband modem 206 may include a signal samples 1006 configured to determine samples for these unused REs and may store the samples in a buffer, e.g. in a memory. Baseband modem 206 may include a noise covariance computer configured to compute the noise covariance based on the samples of the unused REs as described herein.

Figure 11:
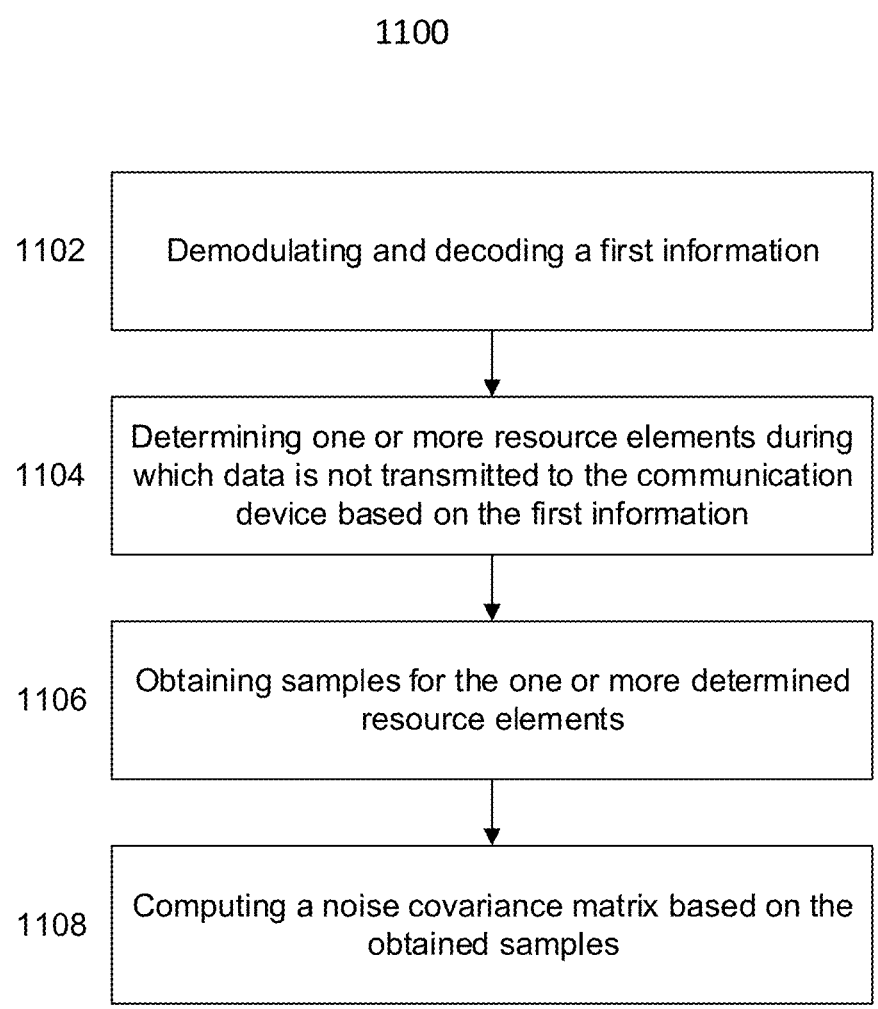
FIG. 11 shows an exemplary flowchart describing a method for noise covariance estimation according to some aspects.

FIG. 11 shows a flowchart 1100 describing a method for noise covariance estimation according to some aspects. It is appreciated that flowchart 1100 is exemplary in nature and may thus be simplified for purposes of this explanation.

The method may include demodulating and decoding a first information 1102; determining one or more resource elements during which data is not transmitted to the communication device based on the first information 1104; obtaining samples for the one or more resource elements 1106; and computing a noise covariance matrix based on the obtained samples 1108.

The following examples pertain to further aspects of this disclosure:

In Example 1, a communication device including one or more processors configured to demodulate and decode a first information; determine one or more resource elements during which data is not transmitted to the communication device based on the first information; obtain samples for the one or more determined resource elements; and compute a noise covariance matrix based on the obtained samples.

In Example 2, the subject matter of Example(s) 1 may include wherein the first information is a control channel information.

In Example 3, the subject matter of Example(s) 2 may include wherein the control channel information is a physical downlink control channel (PDCCH) information.

In Example 4, the subject matter of Example(s) 1-3 may include wherein the demodulated and decoded first information provides demodulation reference signal (DMRS) types transmitted from another device.

In Example 5, the subject matter of Example(s) 4 may include wherein the DMRS types provide frequency and time resource information including transmission information for a plurality of resource elements, wherein each resource element includes a unique space in a time and frequency domain.

In Example 6, the subject matter of Example(s) 1-5 may include wherein the demodulated and decoded first information provides an antenna configuration index of another device.

In Example 7, the subject matter of Example(s) 1-6 may include wherein the one or more determined resource elements includes resource elements reserved to be unused.

In Example 8, the subject matter of Example(s) 1-7 may include wherein the one or more processors are configured to store the obtained samples of the one or more determined resource elements in a memory.

In Example 9, the subject matter of Example(s) 1-8 may include wherein the noise covariance matrix is computed by performing an outer product of the obtained samples for the one or more determined resource elements.

In Example 10, the subject matter of Example(s) 9 may include the one or more processors further configured to determine an average of the outer product.

In Example 11, the subject matter of Example(s) 10 may include the one or more processors further configured to apply the average across all samples taken within a resource block including the one or more determined resource elements.

In Example 12, the subject matter of Example(s) 1-11 may include a receiver configured to receive the control channel information, wherein the one or more processors is configured to obtain the control channel information received at the receiver.

In Example 13, a method for determining a noise covariance matrix for signal processing in a communication device, the method including demodulating and decoding a first information; determining one or more resource elements during which data is not transmitted to the communication device based on the first information; obtaining samples for the one or more determined resource elements; and computing a noise covariance matrix based on the obtained samples.

In Example 14, the subject matter of Example(s) 13 may include wherein the first information is a control channel information.

In Example 15, the subject matter of Example(s) 14 may include wherein the control channel information is a physical downlink control channel (PDCCH) information.

In Example 16, the subject matter of Example(s) 13-15 may include wherein the demodulated and decoded first information provides demodulation reference signal (DMRS) types transmitted from another device.

In Example 17, the subject matter of Example(s) 16 may include wherein the DMRS types provide frequency and time resource information including transmission information for a plurality of resource elements, wherein each resource element includes a unique space in a time and frequency domain.

In Example 18, the subject matter of Example(s) 13-17 may include wherein the demodulated and decoded first information provides an antenna configuration index of another device.

In Example 19, the subject matter of Example(s) 13-18 may include wherein the one or more determined resource elements include resource elements reserved to not be used.

In Example 20, the subject matter of Example(s) 13-19 may include storing the obtained samples of the one or more determined resource elements in a memory.

In Example 21, the subject matter of Example(s) 13-20 may include computing the noise covariance matrix by performing an outer product of the obtained samples for the one or more determined resource elements.

In Example 22, the subject matter of Example(s) 21 may include determining an average of the outer product.

In Example 23, the subject matter of Example(s) 22 may include applying the average across all samples taken within a resource block including the one or more determined resource elements.

In Example 24, the subject matter of Example(s) 13-23 may include receiving the control channel information at a receiver of the communication device.

In Example 25, one or more non-transitory computer-readable media storing instructions thereon that, when executed by at least one processor of a communication device, direct the communication device to perform the method of any one of Examples 12-24.

In Example 26, a communication device including a demodulator and a decoder configured to demodulate and decode a first information; a determiner configured to determine one or more resource elements during which data is not transmitted to the communication device based on the first information; a sampler configured to obtain samples for the one or more determined resource elements; and a computer configured to compute a noise covariance matrix based on the obtained samples.

In Example 27, a communication device including means to demodulate and decode a first information; means to determine one or more resource elements during which data is not transmitted to the communication device based on the first information; means to obtain samples for the one or more determined resource elements; and means to compute a noise covariance matrix based on the obtained samples.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A communication device comprising one or more processors configured to:
    demodulate and decode a first information, wherein the first information is a control channel information;
    determine one or more downlink resource elements during which data is not transmitted to the communication device based on the first information;
    obtain downlink samples from the one or more determined downlink resource elements; and
    compute a noise covariance matrix based on the obtained downlink samples.

2. The communication device of claim 1, the one or more processors further configured to perform a channel estimation based on the computed noise covariance matrix.

3. The communication device of claim 1, wherein the control channel information is a physical downlink control channel (PDCCH) information.

4. The communication device of claim 3, wherein the demodulated and decoded first information provides demodulation reference signal (DMRS) types transmitted from another device.

5. The communication device of claim 4, wherein the DMRS types provide frequency and time resource information comprising transmission information for a plurality of resource elements, wherein each resource element comprises a unique space in a time and frequency domain.

6. The communication device of claim 1, wherein the demodulated and decoded first information provides an antenna configuration index of another device.

7. The communication device of claim 1, wherein the one or more determined resource elements comprise downlink resource elements that are reserved to be unused.

8. The communication device of claim 7, wherein the one or more processors are configured to store the obtained downlink samples from the one or more determined downlink resource elements in a memory.

9. The communication device of claim 8, wherein the noise covariance matrix is computed by performing an outer product of the obtained downlink samples from the one or more determined downlink resource elements.

10. The communication device of claim 9, the one or more processors further configured to determine an average of the outer product.

11. The communication device of claim 10, the one or more processors further configured to apply the average across all samples taken within a resource block including the one or more determined downlink resource elements.

12. The communication device of claim 1, further comprising
a receiver configured to receive the control channel information, wherein the one or more processors are configured to obtain the control channel information received at the receiver.

13. A method for determining a noise covariance matrix for signal processing in a communication device, the method comprising:
demodulating and decoding a first information, wherein the first information is a control channel information;
determining one or more downlink resource elements during which data is not transmitted to the communication device based on the first information;
obtaining downlink samples from the one or more determined downlink resource elements; and
computing a noise covariance matrix based on the obtained downlink samples.

14. The method of claim 13, wherein the one or more determined resource elements comprise resource elements reserved to not be used.

15. The method of claim 14, further comprising computing the noise covariance matrix by performing an outer product of the obtained downlink samples from the one or more determined downlink resource elements.

16. The method of claim 15, further comprising determining an average of the outer product.

17. The method of claim 16, further comprising applying the average across all samples taken within a resource block including the one or more determined downlink resource elements.

18. The method of claim 13, wherein the first information is a physical downlink control channel (PDCCH) information, wherein the demodulated and decoded first information provides demodulation reference signal (DMRS) types transmitted from another device, wherein the DMRS types provide frequency and time resource information comprising transmission information for a plurality of downlink resource elements, wherein each downlink resource element comprises a unique space in a time and frequency domain, wherein the demodulated and decoded first information provides an antenna configuration index of the another device, wherein the one or more downlink resource elements comprise downlink resource elements that are reserved to not be used.

19. One or more non-transitory computer-readable media storing instructions thereon, which when executed by a processor, cause the processor to:
demodulate and decode a first information, wherein the first information is a control channel information;
determine one or more downlink resource elements during which data is not transmitted to the communication device based on the first information;
obtain downlink samples from the one or more determined downlink resource elements; and
compute a noise covariance matrix based on the obtained downlink samples.

20. The one or more non-transitory media of claim 19, further comprising instructions to cause the processor to:
compute the noise covariance matrix by performing an outer product of the obtained downlink samples for the one or more determined downlink resource elements;
determine an average of the outer product; and
apply the average across all samples taken within a resource block including the one or more determined downlink resource elements.

* * * * *